United States Patent
Yeh et al.

(10) Patent No.: US 7,880,801 B2
(45) Date of Patent: Feb. 1, 2011

(54) SYSTEM AND METHOD FOR ASSISTING FIXED-FOCUS IMAGE-CAPTURING DEVICE TO FOCUS

(75) Inventors: Chi-Ping Yeh, Taipei (TW);
Tzan-Sheng Yang, Taipei (TW);
Ching-Ting Tsai, Taipei (TW)

(73) Assignee: Newsoft Technology Corporation, Taipei (TW)

( * ) Notice: Subject to any disclaimer, the term of this patent is extended or adjusted under 35 U.S.C. 154(b) by 346 days.

(21) Appl. No.: 11/818,837

(22) Filed: Jun. 15, 2007

(65) Prior Publication Data
US 2008/0136957 A1    Jun. 12, 2008

(30) Foreign Application Priority Data
Dec. 11, 2006    (TW)    ............... 95146290 A

(51) Int. Cl.
*H04N 5/232* (2006.01)
*G03B 13/00* (2006.01)

(52) U.S. Cl. ............ 348/345; 348/95; 348/333.02

(58) Field of Classification Search .......... 348/345, 348/246, 373, 222, 94, 95
See application file for complete search history.

(56) References Cited

U.S. PATENT DOCUMENTS

| | | | | |
|---|---|---|---|---|
| 6,444,967 B1* | 9/2002 | Kosuge et al. | ........... | 250/201.3 |
| 6,496,244 B2* | 12/2002 | Tseng et al. | ............... | 348/373 |
| 7,054,477 B2* | 5/2006 | Hsu | ........................... | 348/87 |
| 2006/0044452 A1* | 3/2006 | Hagino | ...................... | 348/345 |
| 2006/0077286 A1* | 4/2006 | Wenderski | ................. | 348/373 |
| 2007/0076195 A1* | 4/2007 | Yamaguchi et al. | ...... | 356/237.1 |

* cited by examiner

*Primary Examiner*—Gevell Selby
(74) *Attorney, Agent, or Firm*—Martine Penilla & Gencarella, LLP

(57) ABSTRACT

A system for assisting fixed-focus image-capturing device to focus, which includes: an image-capturing device with fixed-focus function; a platform for placing objects; a movable structure connected to the image-capturing device or the platform, for adjusting the distance between the image-capturing device and the platform; a notifying unit, which generates a physical quantity to notify a user; and a control unit in communication with the image-capturing device and the notifying unit, for determining the distance between the image-capturing device and the platform, and when the distance is equal to a best-shot distance, sending a signal to the notifying unit to generate the physical quantity. The invention also discloses a method for assisting fixed-focus image-capturing device to focus.

22 Claims, 4 Drawing Sheets

SYSTEM AND METHOD FOR ASSISTING FIXED-FOCUS IMAGE-CAPTURING DEVICE TO FOCUS

BACKGROUND OF THE INVENTION a) Field of the Invention

The invention relates to a system and method for assisting image-capturing device to focus and, more particularly, to a system and method for assisting fixed-focus image-capturing device to focus.

b) Description of the Related Art

In order to take clear and accurate pictures of an object to be photographed, a user must first, according to the functional characteristics of a camera or a video camera, find a photographable position, and then adjust the camera/video camera to focus on the object to be photographed, either manually by hand or automatically by camera itself, before pressing the shutter to obtain the sharp and clear image acquired by the user. Among the series of preparation steps, the most important thing is that the user must constantly monitor the viewfinder or the display screen of the camera/video camera, which shows the scene the camera/video camera is capturing, to ensure a good photographic result. Although over the years there are major breakthroughs in the camera industry, such as auto-focusing, focusing lens, digitization, etc., the process in taking a clear photograph is nevertheless similar to the above-mentioned process.

With the conventional picture-taking process, it is inconvenient for a user to take pictures of a large quantity of a specific-type of objects, especially when the user must take pictures of different objects under a circumstance in which he/she cannot monitor the viewfinder/display screen, and the pictures taken as such usually come out blurry. Taking pictures by a notebook computer is a good example of that circumstance. Most notebook computers have built-in digital cameras (web camera), and these cameras can be moved along a fixed trajectory, which implies the possibility of mass photographing, and are much faster than scanners in terms of taking pictures. However, these cameras often do not have auto focus, and so a user has to position the object to be photographed at the focus distance of the camera through monitoring the viewfinder/display screen. But because the computer screen, which serves as the display screen, is blocked due to the folding of the computer panels, on one of which the camera is located and on another of which the object to be photographed may be placed, it would not be easy for the user to monitor the computer screen. Therefore, even if a user were to follow the abovementioned picture-taking steps, a clear image is hard to obtain from the web camera.

The invention is aimed to overcome the limitations described above. The problems to be solved include: assisting a fixed-focus image-capturing device to focus on an object to be photographed while the user is unable to monitor the viewfinder/display screen, automatically detecting placements of an object to be photographed, and automatically taking clear pictures of the object to be photographed.

BRIEF SUMMARY OF THE INVENTION

An object of the invention is to provide a system and method for assisting fixed-focus image-capturing device to focus, wherein the system and method can adjust the distance between an image-capturing device and an object to be photographed to the accurate focus distance for capturing clear images of the object to be photographed without the user having to monitor a display screen or a viewfinder of the image-capturing device.

A system for assisting fixed-focus image-capturing device to focus of the invention includes: an image-capturing device with fixed-focus function; a platform for placing an object to be photographed; a movable structure connected to the image-capturing device or the platform, for adjusting the distance between the image-capturing device and the platform; a notifying unit, which generates a physical quantity to notify a user; and a control unit in communication with the image-capturing device and the notifying unit, which measures the distance between the image-capturing device and the platform and, when the distance between the image-capturing device and the platform is a best-shot distance, sends a signal to the notifying unit to generate the physical quantity. The system further includes a detecting unit, which detects the presence of the object to be photographed and automatically captures the image thereof.

The invention also discloses a method for assisting fixed-focus image-capturing device, wherein the method can be implemented in a photographic environment that has an image-capturing device and a platform with a specific marker, and the steps of the method include: adjusting the distance between the image-capturing device and the platform; determining the distance between the image-capturing device and the platform by using the variation of the image of the specific marker on a display screen relative to distance; and sending a signal when the distance between the image-capturing device and the platform is a best-shot distance. The method further includes, after the sending step, detecting for the presence of an object to be photographed; and when an object to be photographed is present, automatically capturing the image thereof, or else entering a stand-by mode.

In the system and method for assisting fixed-focus image-capturing device to focus of the invention, the best-shot distance refers to the preset focus distance of the image-capturing device, so the user learns about the position at where the image-capturing device can capture clear images of an object to be photographed on the platform through the physical quantity generated by the notifying unit, not through monitoring a display screen or a viewfinder, to ensure whether the position of the image-capturing device is proper to take clear images of the object to be photographed.

DETAILED DESCRIPTION OF THE INVENTION

Figure 1:
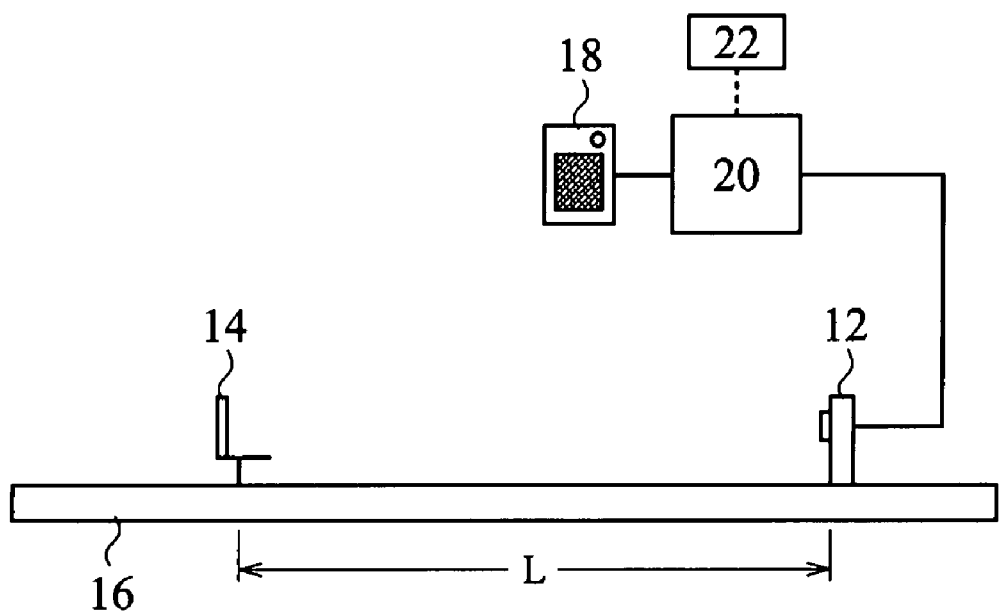
FIG. 1 is a schematic diagram illustrating a system for assisting fixed-focus image-capturing device to focus according to an embodiment of the invention.

The system and method for assisting fixed-focus image-capturing device to focus according to preferred embodiments of the invention will be described below with reference to the drawings, in which like reference numerals denote like elements.

Referring to FIG. 1, a system 1 for assisting fixed-focus image-capturing device to focus according to an embodiment of the invention includes: an image-capturing device 12, a platform 14, a movable structure 16 connected to the image-capturing device 12 or the platform 14, a notifying unit 18, and a control unit 20 in communication with the image-capturing device 12 and the notifying unit 18. The image-capturing device 12 is used to capture the image of an object to be photographed (not shown) and has fixed-focus function with a preset focus distance; the preset focus distance may be set to the original factory specs. The platform 14 includes a specific marker, which is used in determining distance. The movable structure 16 controls and adjusts the distance L between the image-capturing device 12 and the platform 14 and, restricts the movement of the image-capturing device 12 and the platform 14 relative to each other. The control unit 20 is used to determine the distance L between the image-capturing 12 and the platform 14 and, when the distance L is a best-shot distance, to send a signal to the notifying unit 18, which then notifies a user by generating a physical quantity. The system 1 for assisting fixed-focus image-capturing device to focus further includes a detecting unit 22 for automatically detecting the presence of an object to be photographed and capturing the image of the object to be photographed.

Figure 2:
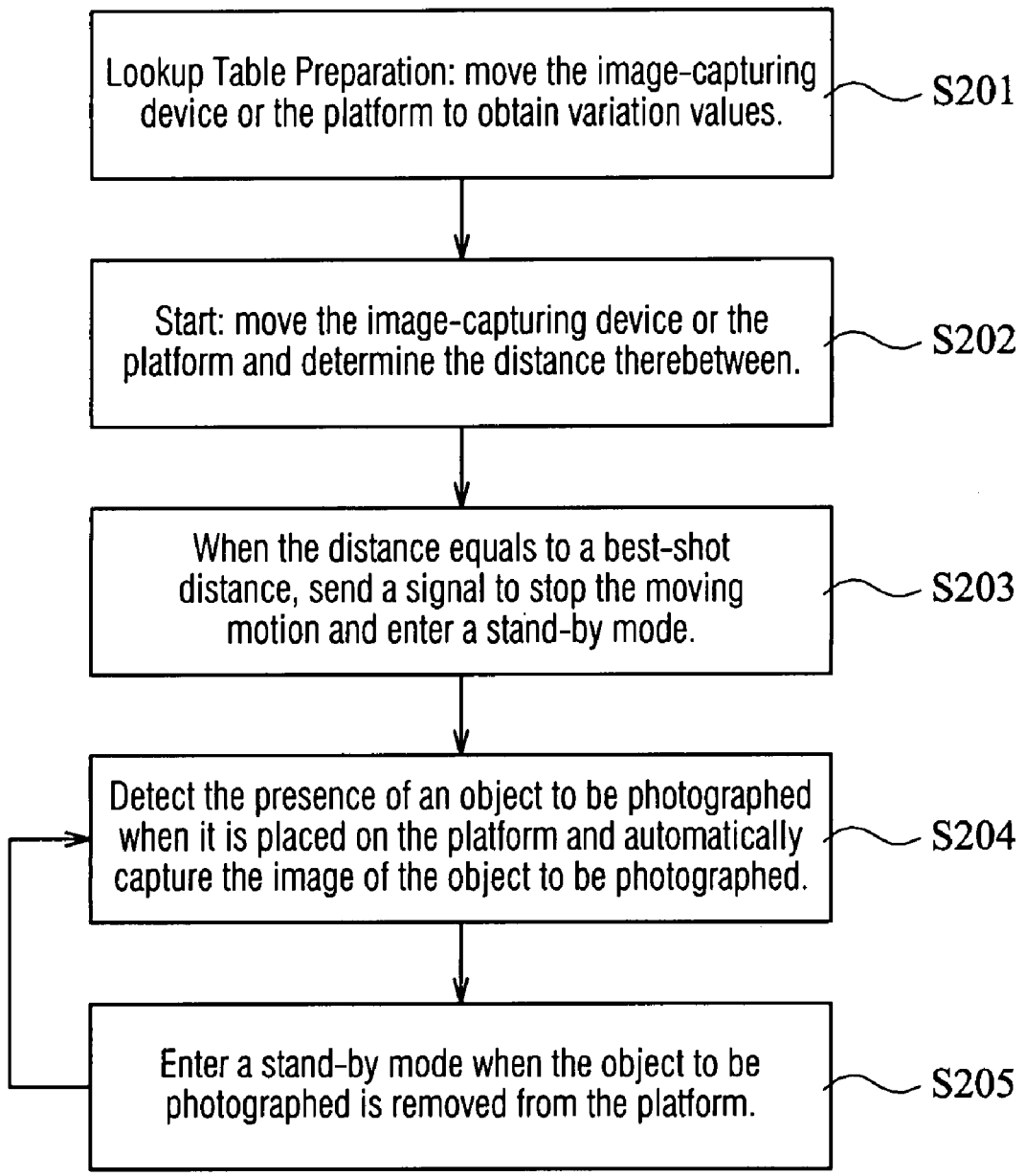
FIG. 2 is a flow chart illustrating a method for assisting fixed-focus image-capturing device to focus according to an embodiment of the invention.
Figure 3A:
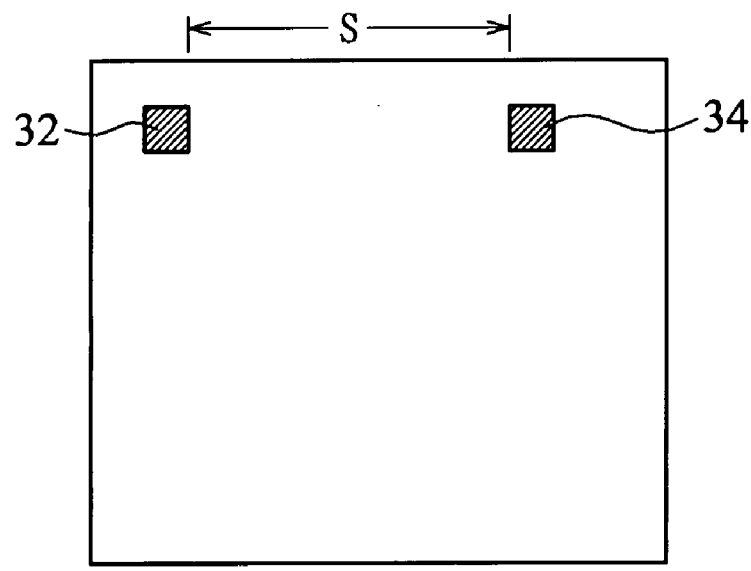
FIGS. 3A, 3B are schematic diagrams illustrating specific markers on a platform.
Figure 3B:
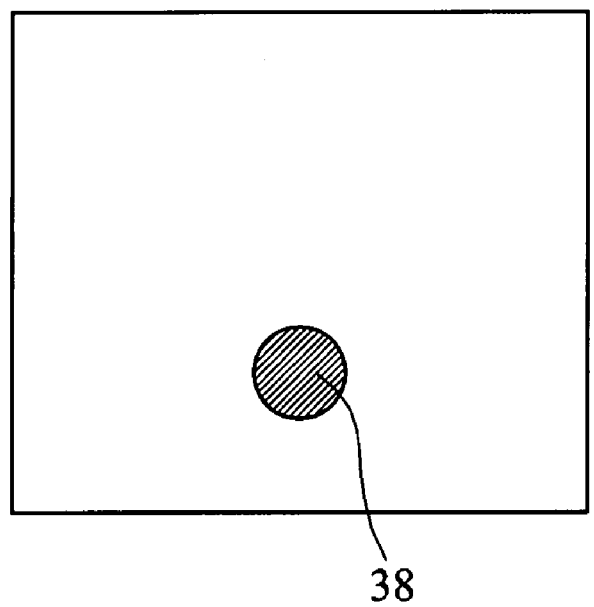

FIG. 2 is a flow chart illustrating a method for assisting fixed-focus image-capturing device to focus using the above-mentioned system 1. Prior to using the method of the invention, the system 1 is to have prepared a lookup table for use. The lookup table documents different values of the distance L between the image-capturing device 12 and the platform 14 and corresponding values of the geometric variable of the specific marker of the platform 14 on a display screen; the display screen shows the scene that is being captured by the image-capturing device 12. The values of the distance L and the geometric variable can be obtained by moving the image-capturing device 12 or the platform 14 or both via the movable structure 16, and hence the lookup table is made (S201). For example, if the specific marker on the platform 14 is two objects 32, 34 as shown in FIG. 3A, because the space s between the two objects 32, 34 shown on the display screen varies with the length of distance L between the image-capturing device 12 and the platform 14, the space s and its corresponding distance L are recorded to form a lookup table. FIG. 3B shows another example, wherein the specific marker on the platform 14 is a pattern 38 with enclosed area, and similar to the example illustrated in FIG. 3A, the area percentage occupied by the pattern 38 on the display screen varies with the length of distance L between the image-capturing device 12 and the platform 14, thus the area percentage and its corresponding distance L are recorded, forming a lookup table. It is to be noted that a lookup table can be used repeatedly with the same specific marker; if the platform 14 has a new specific marker, then a new lookup table that corresponds to the new specific marker must be prepared. In other words, it is unnecessary to remake the lookup table before each use of the method according to the invention.

With the made lookup table, the method for assisting fixed-focus image-capturing device to focus according to the invention can be executed. Referring to step S202 in FIG. 2, a user adjusts the distance L between the image-capturing device 12 and the platform 14 by using the movable structure 16; the movable structure 16 can be moved manually, mechanically, or electrically. During the distance adjustment, the control unit 20 of the system 1 determines the distance L by insertion method: using the changes in the image of the specific marker of the platform 14 on the display screen relative to the distance L and referencing with the lookup table. The detailed description on changes in the image of the specific marker on the display screen relative to distance is as described in aforementioned examples and hence is not further described herein. When the distance L between the image-capturing device 12 and the platform 14 is a best-shot distance, the control unit 20 sends a signal to the notifying unit 18 and the notifying unit 18 in response thereto notifies the user so as to stop the motion of the movable structure 16 (S203). The notifying unit 18 notifies the user by generating a physical quantity that is identifiable to the user; for instance, the physical quantity can achieve sound or visual effects. Since the best-shot distance is the preset focus distance of the image-capturing device 12, the image-capturing device 12 can be put at a position where it is accurately the focus distance away from the platform 14 without the user having to monitor the display screen at all. The system 1 enters a stand-by mode when the distance L between the image-capturing device 12 and the platform 14 is the best-shot distance and the movable structure 16 stopped moving.

According to an embodiment of the system and method for assisting fixed-focus image-capturing device to focus of the invention, the capturing of the image of the object to be photographed can begin after the image-capturing device 12 is correctly focused and the system 1 is standing-by. In the stand-by mode, the platform 14 is monitored for a picture-taking status, so when the user places an object to be photographed on the platform 14, the detecting unit 22 observes the presence of the object to be photographed and automatically captures the image thereof (S204). The detecting unit 22 determines whether an object to be photographed is placed on the platform 14 or not by detecting changes to the picture-taking status; for example, when the specific marker on the platform 14 disappears or changes on the display screen, that means an object to be photographed is placed on the platform 14. Likewise, when the specific marker on the platform 14 returns to the display screen, that means the object to be photographed has been removed, and the system 1 returns to the stand-by mode (S205) until the next object to be photographed is detected, where then the image thereof is automatically captured by the system 1 (S204). Therefore, the user can obtain accurate, clear and sharp images without having to monitor the display screen at all during the image-capturing process.

Figure 4:
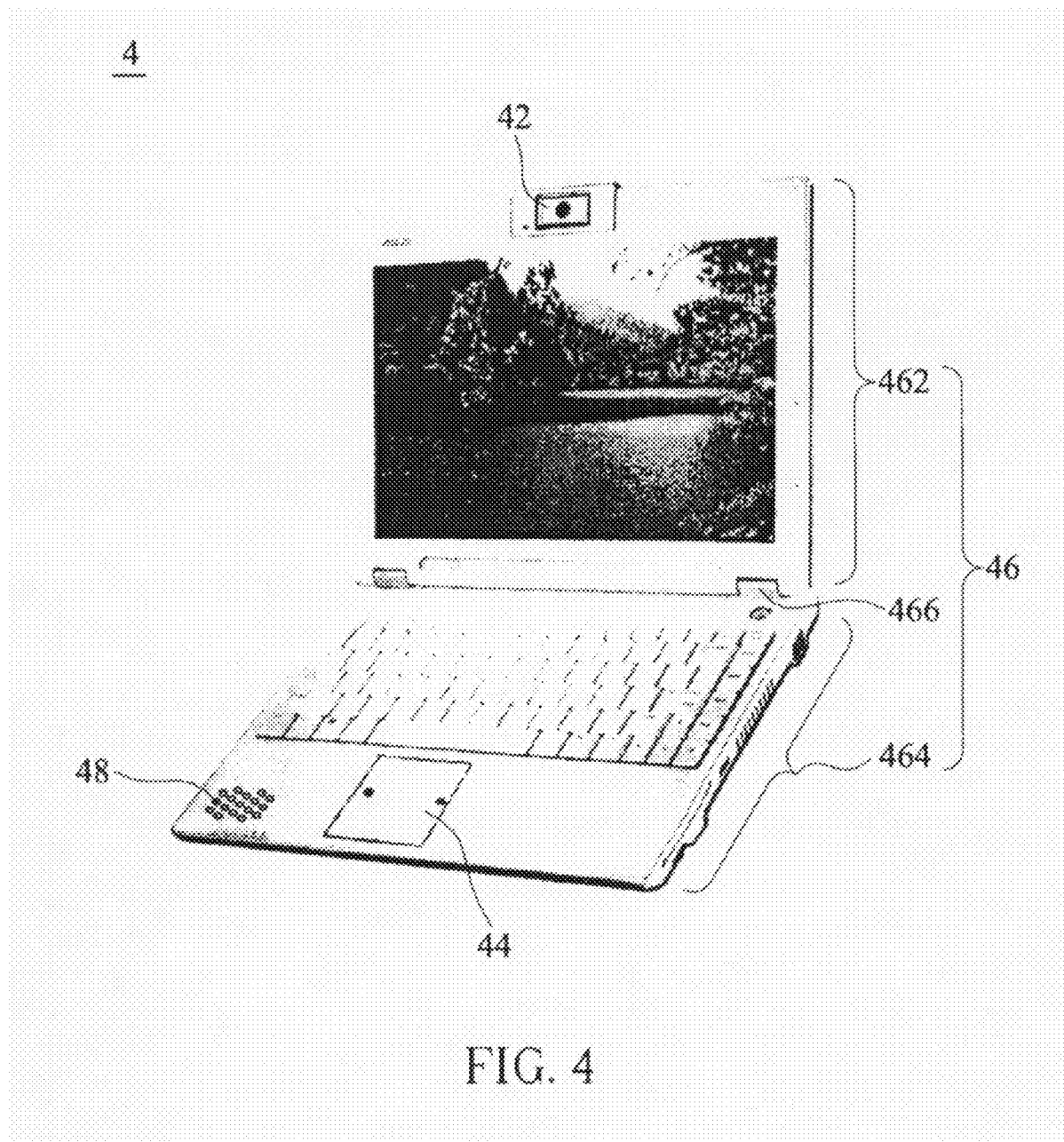
FIG. 4 is a schematic diagram illustrating a notebook computer in which a system for assisting fixed-focus image-capturing device to focus according to an embodiment of the invention is implemented.

Referring to FIG. 4 for a description on the application of the system for assisting fixed-focus image-capturing device to focus according to an embodiment of the invention. The system can be integrated with a notebook computer 4, wherein a web camera 42 located on top of the upper panel 462 of the computer 4 serves as an image-capturing device; a touchpad 44 of the computer 4 serves as a platform; the entire casing 46 of the computer 4, including the upper panel 462, the bottom panel 464, and the pivot 466, serves as a movable structure, wherein the upper panel 462 and the bottom panel 464 are pivoted at the pivot 466, and the pivotal motion of the upper panel 462 relative to the bottom panel 464 (opening and closing of the notebook computer) is the aforementioned restricted movement of the image-capturing device and the platform relative to each other; software (not illustrated in FIG. 4) is used to perform the functions of a control unit and a detecting unit; and a speaker 48 of the computer 4 serve as a notifying unit.

The use of the notebook computer 4 to capture an image of an object to be photographed is described below. A user slowly closes the upper panel 462 of the computer 4 towards the bottom panel 464, and as the web camera 42 gets near the touchpad 44, the software determines the distance therebetween and, as the distance approaches the preset focus distance of the web camera 42, sends a signal and triggers the speaker 48 to beep (for instance, short beeps), notifying the user that the target position is near. When the distance between the web camera 42 and the touchpad 44 is equal to the preset focus distance, the speaker 48 sends out a different beeping sound (for instance, a long beep) to notify the user to stop the folding motion, maintaining the current distance between the upper panel 462 and the bottom panel 464, and at this time, the notebook computer 4 enters a stand-by mode. When the user places an object to be photographed (not shown), like a name card, on the touchpad 44, the software automatically detects the presence of the name card and the web camera 42 captures the image of the name card automatically; thereafter the user can remove the name card and place another name card on the touchpad 44. The notebook computer 4 returns to the stand-by mode after the software detected the removal of the name card and captures images automatically after the placement of another name card is detected by the software, and the process repeats until all images of the objects to be photographed are captured.

In a photographic environment which the system and method of the invention is implemented, the image-capturing device can be a digital camera with preset focus distance or a fixed-focus video camera with picture-taking capabilities; the platform can include a plane opposite to the image-capturing device for placing the specific marker thereon. Moreover, the movable structure can be a track, along which the image-capturing device and the platform can slide, or a flexible mechanical arm, which can push the image-capturing device towards the platform or vice versa, or a pivot and a pole, which allows the image-capturing device or the platform to move circumferentially. In addition, the control unit can be in signal communication or in wire communication with the image-capturing device or the detecting device or the notifying unit; furthermore, the control unit and the detecting unit can be integrated into one component, such as software or IC chip. Also, the physical quantity produced by the notifying unit can cause user-identifiable signs like sound, light, vibration, etc.

While the invention has been described by way of examples and in terms of the preferred embodiments, it is to be understood that the invention is not limited to the disclosed embodiments. In other words, it is intended to include equivalent modifications and changes of the above embodiments without departing from the spirit and scope of the invention as would be apparent to those skilled in the art. Therefore, the scope of the appended claims should be accorded the broadest interpretation so as to encompass all such equivalent modifications and changes.

What is claimed is:

1. A system for assisting fixed-focus image-capturing device to focus, comprising:
   an image-capturing device with fixed-focus function;
   a platform, for placing an object to be photographed, the platform including at least one specific marker;
   a movable structure connected to the image-capturing device or the platform, for adjusting the distance between the image-capturing device and the platform;
   a notifying unit, for generating a physical quantity to notify a user; and
   a control unit in communication with the image-capturing device and the notifying unit, for determining the distance between the image-capturing device and the platform and, when the distance between the image-capturing device and the platform equals a best-shot distance, sending a signal to the notifying unit to notify the user, wherein a geometric variable of an image of the specific marker on a display screen varies with the distance between the image-capturing device and the platform, and the variation of the geometric variable is used by the control unit to determine the distance between the image-capturing device and the platform.

2. The system for assisting fixed-focus image-capturing device to focus as described in claim 1, wherein the image-capturing device has a preset focus distance.

3. The system for assisting fixed-focus image-capturing device to focus as described in claim 2, wherein the image-capturing device is a digital camera.

4. The system for assisting fixed-focus image-capturing device to focus as described in claim 2, wherein the best-shot distance is the preset focus distance of the image-capturing device.

5. The system for assisting fixed-focus image-capturing device to focus as described in claim 1, wherein the platform includes two specific markers, and the geometric variable includes the relative percentage of the distance between the two specific markers on the display screen.

6. The system for assisting fixed-focus image-capturing device to focus as described in claim 1, wherein the physical quantity generated by the notifying unit is capable of achieving sound or visual effect.

7. The system for assisting fixed-focus image-capturing device to focus as described in claim 1, wherein the movable structure is a structure that restricts the movement of the image-capturing device and the platform relative to each other.

8. The system for assisting fixed-focus image-capturing device to focus as described in claim 1, wherein the control unit is in signal communication with the notifying unit or the image-capturing device.

9. The system for assisting fixed-focus image-capturing device to focus as described in claim 1, further comprising:
   a detecting unit, which detects the presence of the object to be photographed and captures the image thereof automatically.

10. The system for assisting fixed-focus image-capturing device to focus as described in claim 9, wherein the detecting unit constantly monitors the platform for a picture-taking status and automatically observes changes to the status, in which if the status is changed, then the object to be photographed has been placed on the platform.

11. The system for assisting fixed-focus image-capturing device to focus as described in claim 9, wherein the control unit and the detecting unit are integrated.

12. The system for assisting fixed-focus image-capturing device to focus as described in claim 9, wherein the system is integrated with a notebook computer, in which a web camera serves as the image-capturing device; a touchpad serves as the platform; a top panel of the notebook computer pivoted to a bottom panel of the notebook computer, the combination of which serves as the movable structure; the control unit and the detecting unit are implemented by software; and a speaker serves as the notifying unit.

13. The system for assisting fixed-focus image-capturing device to focus as described in claim 1, wherein the platform includes one specific marker with enclosed area, and the geometric variable includes the area percentage occupied by the specific marker on the display screen.

14. A method for assisting fixed-focus image-capturing device to focus, which is implemented in a photographic environment comprising an image-capturing device and a platform including at least one specific marker, the method comprising:

adjusting the distance between the image-capturing device and the platform;

determining a geometric variable of an image of the specific marker on a display screen, the geometric variable varying with the distance between the image-capturing device and the platform;

determining the distance between the image-capturing device and the platform by using the variation of the geometric variable; and sending a signal when the distance between the image-capturing device and the platform is a best-shot distance.

15. The method for assisting fixed-focus image-capturing device to focus as described in claim 14, wherein the image-capturing device has a preset focus distance.

16. The method for assisting fixed-focus image-capturing device to focus as described in claim 15, wherein the best shot distance is the preset focus distance of the image-capturing device.

17. The method for assisting fixed-focus image-capturing device to focus as described in claim 14, wherein the platform includes two specific markers of, the geometric variable includes the relative percentage of the distance between the two specific markers on the display screen.

18. The method for assisting fixed-focus image-capturing device to focus as described in claim 14, wherein the signal is sent to achieve sound or visual effect.

19. The method for assisting fixed-focus image-capturing device to focus as described in claim 14, further comprising:

detecting for the presence of an object to be photographed;

when an object to be photographed is present on the platform, automatically capturing the image of the object; and when an object to be photographed is not present on the platform, entering a stand-by mode.

20. The method for assisting fixed-focus image-capturing device to focus as described in claim 19, wherein the detecting step determines whether the object to be photographed has been placed on the platform or not by observing the changes of a picture taking status at the platform.

21. The method for assisting fixed-focus image-capturing device to focus as described in claim 14, further comprising:

making a look-up table, which lists the geometric variable of the image of the specific marker on the display screen and the distance between the image-capturing device and the platform corresponding thereto.

22. The method for assisting fixed-focus image-capturing device to focus as described in claim 14, wherein the platform includes one specific marker with enclosed area, and the geometric variable includes the area percentage occupied by the specific marker on the display screen.

* * * * *